United States Patent Office 3,129,238
Patented Apr. 14, 1964

3,129,238
DIBENZOCYCLOHEPTADIENYL ISOCYANATE
AND ACETYLUREAS
Martin A. Davis, Montreal, Quebec, Canada, assignor to American Home Products Corporation, New York, N.Y., a corporation of Delaware
No Drawing. Filed July 20, 1962, Ser. No. 211,421
4 Claims. (Cl. 260—453)

This invention relates to a novel chemical compound having valuable biological properties and to the novel chemical intermediates used in its preparation.

More particularly, it relates to an acylurea derivative, specifically 1-(5 - dibenzo[a,d][1,4]cycloheptadienyl)-3-acetylurea, which may be represented by the following structural formula:

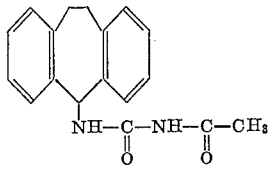

The novel acylurea of this invention possesses ability to offer protection against the seizures caused by electroshock. This anticonvulsant action is elicited in dosages well below those causing toxic manifestations and is observed when this agent is given orally or by injection.

Thus for the treatment or prevention of convulsive disorders the agent may be administered orally in the form of dry powder capsules or compressed tablets. These capsules or tablets may be formulated with pharmaceutically acceptable carriers such as, for example, starch, lactose, magnesium stearate and the like, and compounded in a manner to give from 200 to 400 mg. of the active agent per unit dosage form.

Alternatively the active agent may be administered by injection in the form of finely divided aqueous suspensions containing pharmaceutically acceptable dispersing agents such, as for example, polyoxyethylene sorbitan oleates.

The novel acylurea of this invention may be prepared in the following manner. A heavy-metal cyanate, preferably silver cyanate, is reacted with 5-chlorodibenzo-[a,d][1,4]cycloheptadiene in an appropriate solvent and at an elevated temperature; similar conditions have been described by J. J. Donleavy and J. English Jr. in J. Amer. Chem. Soc., 62, 219 (1940) for the preparation of benzhydryl isocyanate from benzhydryl bromide and silver cyanate. For the preparation of 5-dibenzo[a,d][1,4]cycloheptadienyl isocyanate it has been found convenient to employ anhydrous acetonitrile as the solvent, and to carry out the reaction at the boiling point of this solvent for a period of time of the order of twelve hours. The isocyante may be isolated by filtration of the reaction mixture and evaporation of the filtrate. It may then be purified in the conventional manner by recrystallization from an appropriate solvent.

The next step in the sequence of reactions, that is the preparation of 1-(5-dibenzo[a,d][1,4]cycloheptadienyl)-urea, may be carried out by treatment of the above-mentioned isocyanate with ammonia. The reaction may be advantageously performed by interacting the isocyanate dissolved in an appropriate solvent such as, for example, acetone, with concentrated ammonium hydroxide. The reaction is completed by brief heating and the resulting urea may be isolated by filtration of the reaction mixture.

The final product, 1-(5-dibenzo[a,d][1,4]cycloheptadienyl)-3-acetylurea, may be prepared by treating the above-mentioned urea with an acetylating agent in the presence of an acid binding agent in accordance with the procedures set forth in U.S. Patent No. 2,560,522. The reaction may be advantageously carried out by treating a suspension of the urea in a tertiary amine such as, for example, pyridine, with acetyl chloride. The reaction is completed by heating, and the product is isolated by dilution of the reaction mixture with ethanol and water, followed by filtration of the solid material thus formed.

This sequence of reactions may be schematically indicated as follows:

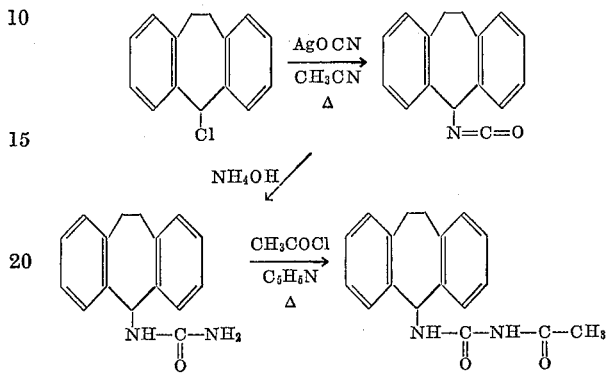

The following examples illustrate my invention.

EXAMPLE 1

*5-Dibenzo[a,d][1,4]Cycloheptadienyl Isocyanate*

A stirred mixture of silver cyanate (22.5 g.; 0.15 mole) and 5-chloro-dibenzo[a,d][1,4]cycloheptadiene (22.9 g.; 0.10 mole) in anhydrous acetonitrile (140 ml.) contained in a flask protected from light was gradually heated to the boiling point and the mixture was kept under reflux for 12 hours. The insoluble material was filtered off, and the solution was then concentrated in vacuo i.e. at a pressure less than atmospheric. The solid residue, thus obtained, was triturated with several portions of hot hexane. Evaporation of the combined hexane extracts left 17.4 g. of 5-dibenzo[a,d][1,4]cycloheptadienyl isocyanate; M.P. 62–63° C. This melting point was unchanged on recrystallization from petroleum ether (B.P. below 40° C.).

Analysis confirmed the empiric formula $C_{16}H_{13}NO$. Required: C, 81.68; H, 5.57; N, 5.95%. Found: C, 81.49; H, 5.74; N, 5.80, 5.82%.

EXAMPLE 2

*1-(5-Dibenzo[a,d][1,4]Cycloheptadienyl)Urea*

A solution of the isocyanate prepared as described in Example 1 (6.3 g.) in acetone (40 ml.) was added dropwise and with stirring to concentrated ammonium hydroxide (30 ml.). A copious precipitate formed. The reaction mixture was then heated under reflux for one-half hour, cooled, diluted with water, and the precipitate was filtered off and dried. There was then obtained 6.2 g. of 1-(5-dibenzo[a,d][1,4]cycloheptadienyl)urea; M.P. 280–281° C. (dec.).

A purified sample was obtained in the form of long, threadlike needles; M.P. 282–283° C. (dec.) upon recrystallization from an ethanol-ethylene dichloride mixture.

Analysis confirmed the empiric formula $C_{16}H_{16}N_2O$. Required: C, 76.16; H, 6.39%; N, 11.10%. Found: C, 76.52; H, 6.48; N, 10.75%.

EXAMPLE 3

*1-(5-Dibenzo[a,d][1,4]Cycloheptadienyl)-3-Acetylurea*

A suspension of the urea prepared as described in Example 2 (6.1 g.; 0.024 mole) in dry pyridine (15 ml.) was cooled in an ice bath, and acetyl chloride (2.5 g.; 0.032 mole) was added dropwise, with stirring. The cooling bath was removed and the mixture was heated on the steam bath for one-half hour. It was again cooled and treated with ethanol (15 ml.), and with water (150 ml.).

The solid material was filtered off, washed with water, and recrystallized once from aqueous ethanol. There was thus obtained 5.6 g. of 1-(5-dibenzo[a,d][1,4]cycloheptadienyl)-3-acetylurea; M.P. 197–200° C. Further recrystallizations from ethanol, or from ethyl acetate, afforded a purified sample in the form of short white needles; M.P. 203–204° C.

Analysis confirmed the empiric formula $C_{18}H_{18}N_2O_2$. Required: C, 73.45; H, 6.16; N, 9.52%. Found: C, 73.24; H, 6.31; N, 9.32, 9.50%.

I claim:

1. A compound of the formula:

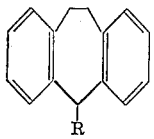

wherein R is selected from the group of radicals consisting of —N=C=O;

—NH—C—NH$_2$ and —NH—C—NH—C—CH$_3$
  ‖      ‖   ‖
  O      O   O 2. 1 - (5-dibenzo[a,d][1,4]cycloheptadienyl)-3-acetylurea.

3. 1-(5-dibenzo[a,d][1,4]cycloheptadienyl)urea.

4. 5-dibenzo[a,d][1,4]cycloheptadienyl isocyanate.

References Cited in the file of this patent

UNITED STATES PATENTS 2,560,522  Duschinsky _____ July 10, 1951

OTHER REFERENCES

Donleary et al.: J. Am. Chem. Soc., 62, 219 (1940).

Noller: Chemistry of Organic Compounds, 2nd ed., p. 317 (1957).

Tchiroukhine et al.: Compt. Rendus 244, 2518–20 (1957).